(12) United States Patent
Oosawa

(10) Patent No.: US 8,342,617 B2
(45) Date of Patent: Jan. 1, 2013

(54) AUTOMOTIVE HYDRAULIC BRAKE SYSTEM

(75) Inventor: Toshiya Oosawa, Yokohama (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 428 days.

(21) Appl. No.: 12/683,139

(22) Filed: Jan. 6, 2010

(65) Prior Publication Data

US 2010/0244553 A1     Sep. 30, 2010

(30) Foreign Application Priority Data

Mar. 24, 2009   (JP) ................................ 2009-072248

(51) Int. Cl.
*B60T 8/40* (2006.01)

(52) U.S. Cl. .................... 303/116.1; 303/10; 303/113.1; 303/119.1

(58) Field of Classification Search ............ 303/10, 303/11, 113.1, 116.1, 116.4, 117.1, 119.1
See application file for complete search history.

(56) References Cited

U.S. PATENT DOCUMENTS

| | | | | |
|---|---|---|---|---|
| 5,405,191 A | * | 4/1995 | Nishiyama et al. | 303/116.1 |
| 6,302,498 B1 | * | 10/2001 | Ariki et al. | 303/115.4 |
| 6,386,646 B1 | * | 5/2002 | Hinz et al. | 303/116.1 |

FOREIGN PATENT DOCUMENTS

| | | |
|---|---|---|
| DE | 42 02 388 A1 | 8/1993 |
| JP | 5-262218 A | 10/1993 |
| JP | 2007-238095 A | 9/2007 |

\* cited by examiner

*Primary Examiner* — Thomas J Williams

(74) *Attorney, Agent, or Firm* — Crowell & Moring LLP

(57) ABSTRACT

An automotive hydraulic brake system is provided which exhibits an excellent pressure reduction performance to a low μ road while restraining an intake resistance of a fluid pump. For providing the hydraulic brake system, a gate-in valve is connected to an intake passage that connects a master cylinder to an intake side of the fluid pump. The gate-in valve selectively opens and closes the intake passage in accordance with a mutual relation between a master cylinder pressure and a pressure produced at an intake side of the fluid pump.

12 Claims, 6 Drawing Sheets

(MASTER CYLINDER SIDE)

AUTOMOTIVE HYDRAULIC BRAKE SYSTEM

BACKGROUND OF THE INVENTION

1. Field of the Invention

The present invention relates in general to automotive hydraulic brake systems, and more particularly to the automotive hydraulic brake systems of a type that obtains a sufficient pressure reduction performance to a low μ road while restraining a fluid intake resistance of a brake fluid pump.

2. Description of the Related Art

Before describing the automotive hydraulic brake system of the present invention, meaning of the low μ road and the pressure reducing performance will be explained. That is, the low μ road is a road of which surface has a low coefficient of friction and the pressure reduction performance is a performance in effectively reducing the brake fluid pressure for wheel cylinders of the hydraulic brake system, that is needed when the vehicle is braked without skid.

One of the automotive brake systems of the above-mentioned type is described in Japanese Laid-open Patent Application (Tokkai) 2007-238095. In the automotive hydraulic brake system of the publication, there is employed an internal reservoir that temporarily reserves a brake fluid from wheel cylinders for adjusting a fluid pressure that is applied from a master cylinder to an intake port of a fluid pump. The internal reservoir shown by the publication comprises a larger main case, a smaller auxiliary case, an apertured valve seat portion through which the main and auxiliary cases are connected, a piston slidably disposed in the main case, a biasing spring installed in the main case to bias the piston toward the auxiliary case, a pin connected to the piston and extending to the auxiliary case through the apertured valve seat portion, a ball (or valve body) placed in the auxiliary case and contactable to a leading end of the pin to move therewith. An operation chamber of the main case is connected to an inlet port of a rotary pump and the auxiliary case is connected to a downstream side of a brake fluid circuit.

SUMMARY OF THE INVENTION

For properly operating the hydraulic brake system of the publication against a higher master cylinder pressure, the biasing spring of the reservoir should be set to have a higher spring force or a size (or pressure receiving area) of the ball (or valve body) should be reduced. However, if the biasing spring is set to have a higher spring force, the pressure of the brake fluid from the wheel cylinders becomes higher, and thus, it is difficult to obtain a sufficient pressure reduction performance to a low μ road. While, if the size of the ball (or valve body) is small, a sufficient pressure reduction performance to the low μ road is obtainable. However, in this case, a fluid intake resistance of the brake fluid pump at the time when the brake fluid is sucked from the master cylinder side is increased and thus pressure boosting performance is lowered.

Accordingly, an object of the present invention is to provide an automotive hydraulic brake system which is free of the above-mentioned drawbacks.

According to the present invention, there is provided an automotive hydraulic brake system which obtains a sufficient pressure reduction performance to a low μ road while restraining a fluid intake resistance of a brake fluid pump.

In the automotive hydraulic brake system of the present invention, a fluid intake passage extending from a master cylinder to a rotary fluid pump is equipped with a gate-in valve that is operated to selectively open and close the fluid intake passage in accordance with a pressure relation between a master cylinder pressure and an inlet pressure of the rotary fluid pump.

In accordance with a first aspect of the present invention, there is provided a hydraulic brake system which comprises an intake passage connecting a master cylinder to an intake side of a fluid pump; a discharge passage connecting a discharge side of the fluid pump to the master cylinder; a first passage branched from the discharge passage and connected to a wheel cylinder; a pressure reduction passage connected to a reservoir that reserves a pressure reduced brake fluid from the wheel cylinder; an outlet passage connecting the reservoir to the intake passage; and a gate-in valve that selectively opens and closes the intake passage in accordance with both a master cylinder pressure produced by the master cylinder and a pump intake side pressure produced in an intake side of the fluid pump.

In accordance with a second aspect of the present invention, there is provided a hydraulic brake system which comprises a fluid pump driven by an electric motor; and a housing that houses therein the fluid pump, wherein the housing comprises a master cylinder port to be connected to a master cylinder that is arranged outside the housing; an intake passage connecting the master cylinder port to an intake side of the fluid pump; a discharge passage connecting a discharge side of the fluid pump to the master cylinder port; a first passage branched from the discharge passage; a wheel cylinder port connecting the first passage to a wheel cylinder that is arranged outside of the housing; a pressure reduction passage through which a brake fluid in the wheel cylinder is led into a reservoir through the wheel cylinder port; and an outlet passage connecting the reservoir to the intake passage, and wherein the intake passage is provided with a pressure valve that selectively opens and closes the intake passage in accordance with a pressure difference between pressures respectively appearing at upstream and downstream portions of the intake passage with respect to the pressure valve.

In accordance with a third aspect of the present invention, there is provided a hydraulic brake system which comprises a housing therein a fluid pump; an intake passage connecting an outside portion of the housing to an intake side of the fluid pump; a discharge passage connecting a discharge side of the fluid pump to the outside portion of the housing; a first passage branched from the discharge passage and connected to a wheel cylinder that is positioned outside the housing; a pressure reduction passage through which a brake fluid in the wheel to cylinder is led into a reservoir; an outlet passage connecting the reservoir to the intake passage; and a gate-in valve provided by the intake passage, the gate-in valve selectively opening and closing the intake passage in accordance with a pressure difference between pressures respectively appearing at upstream and downstream portions of the intake passage with respect to the gate-in valve, wherein the fluid pump is arranged to suck the brake fluid through the gate-in valve from the outside portion of the housing.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, embodiments 100, 200 and 300 of the present invention will be described in detail with reference to the accompanying drawings.

In the following, for ease of understanding, various directional terms, such as, right, left, upper, lower, rightward and is the like are used in the direction. However, such terms are to be understood with respect to only a drawing or drawings on which the corresponding part or portion is shown.

First, a hydraulic brake system of a first embodiment 100 will be described with the aid of FIGS. 1 to 5.

As will become apparent as the description proceeds, the hydraulic brake system of the first embodiment 100 is of a mechanical & electric part integral type which generally comprises a master cylinder M/C, wheel cylinders W/C, an electric motor, hydraulic pumps, electromagnetic valves, sensors, a hydraulic unit 31 that is interposed between the master cylinder M/C and each of the wheel cylinders W/C and a control unit CU that is integrally mounted to the hydraulic unit 31 to control the electric motors and electromagnetic valves by processing information signals from the sensors. Of course, the hydraulic unit 31 and the control unit CU may have separate construction.

Figure 1:
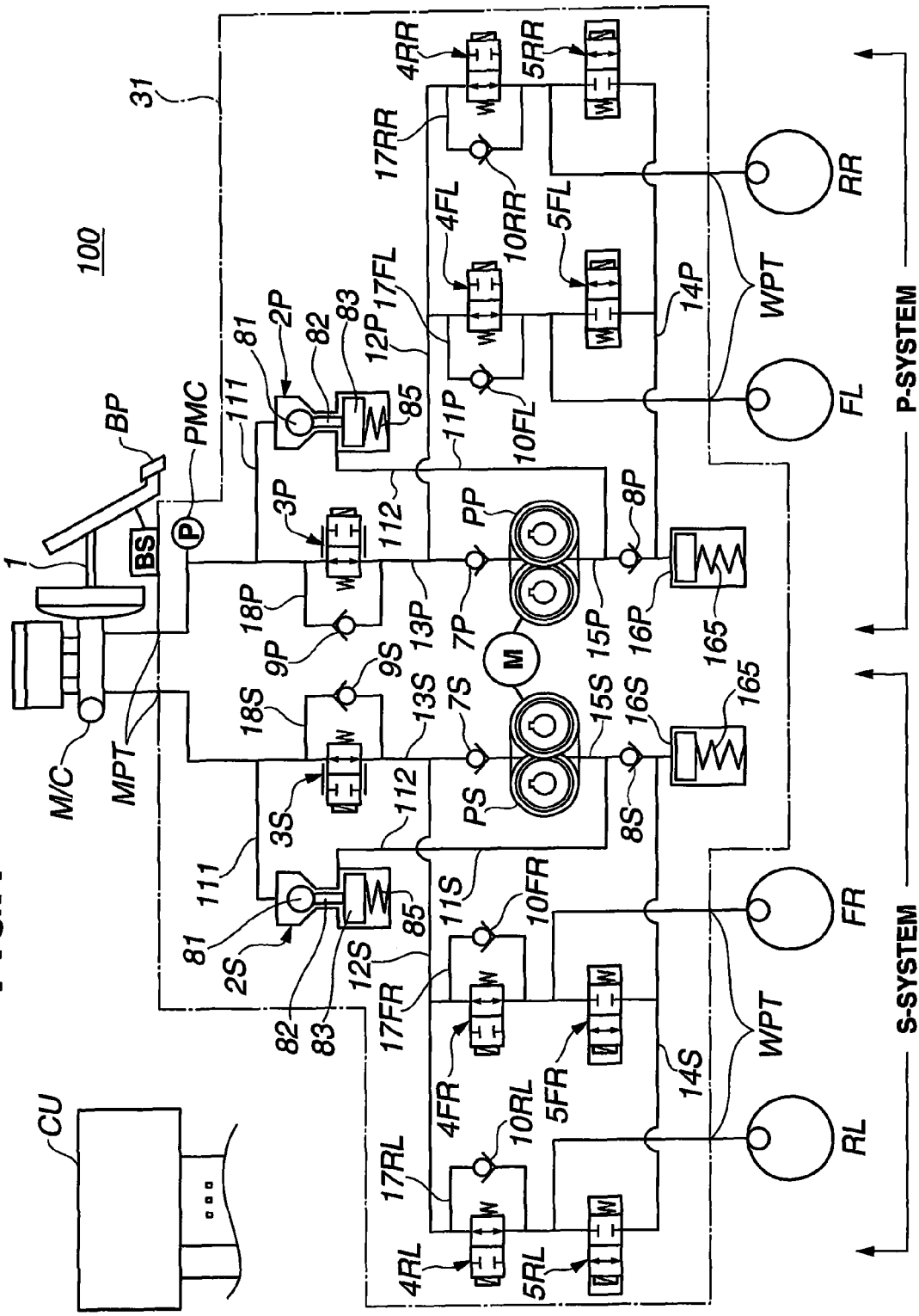
FIG. 1 is a schematic view of a hydraulic circuit of an automotive hydraulic brake system of a first embodiment of the present invention.

Referring to FIG. 1, there is schematically shown a hydraulic circuit of an automotive hydraulic brake system of the first embodiment 100 of the present invention.

In the drawing, denoted by numeral 31 is a hydraulic unit. The hydraulic brake system of the first embodiment 100 generally comprises P-system and S-system that are fluidly connected to each other via so-called X-piping.

As is seen from FIG. 1, to the P-system, there are connected both a wheel cylinder W/C(FL) of a front left road wheel and a wheel cylinder W/C(RR) of a rear right road wheel, and to the S-system, there are connected both a wheel cylinder W/C (FR) of a front right road wheel and a wheel cylinder W/C (RL) of a rear left road wheel.

The P-system and S-system are equipped with respective pumps PP and PS which are driven by a single electric motor M. However, if desired, these pumps PP and PS may be driven by respective electric motors. As the pumps PP and PS, various types may be used.

Denoted by reference BP is a brake pedal that is to be depressed by a driver for braking an associated motor vehicle. A brake switch BS is connected to the brake pedal BP to detect an operation condition of the brake pedal BP. The brake pedal BP is connected to a master cylinder M/C through an input rod 1.

The master cylinder M/C is connected to intake ports of the two pumps PP and PS through respective intake passages 11P and 11S. Each intake passage 11P or 11S is equipped with a gate-in valve (or differential pressure valve) 2P or 2S. In each intake passage 11P or 11S, a part that extends between the master cylinder M/C and the gate-in valve 2P or 2S will be named "master cylinder side passage" and denoted by numeral 111, and a part that extends between the gate-in valve 2P or 2S and the intake port of the pump PP or PS will be named "pump intake side passage" and denoted by numeral 112. The detail of the gate-in valve 2P or 2S will be described hereinafter.

Between the master cylinder M/C and the gate-in valve 2P, there is connected a pressure sensor PMC that detects a hydraulic pressure produced by the master cylinder M/C.

Between the master cylinder M/C and an outlet port of each pump PP or PS, there extends a passage (or discharge passage) 13P or 13S.

Between the outlet port of each pump PP or PS and intake ports of the wheel cylinders W/C(FL) and W/C(RR) or [W/C (RL) and W/C(FR)], there extends a passage (or first hydraulic passage) 12P or 12S. On a part of the passage 12P that extends to the wheel cylinder W/C(FL), there is mounted a solenoid-in valve 4FL, and on the other part of the passage 12P that extends to the wheel cylinder W/C(RR), there is mounted a solenoid-in valve 4RR. Similarly, on a part of the passage 12S that extends to the wheel cylinder W/C(FR), there is mounted a solenoid-in valve 4FR, and on the other part of the passage 12S that extends to the wheel cylinder W/C(RL), there is mounted a solenoid-in valve 4RL. These solenoid-in valves 4FL, 4RR, 4FR and 4RL are of a normal open type electromagnetic valve.

On the discharge passage 13P or 13S at a position just downstream of the outlet port of the pump PP or PS, there is provided a check valve 7P or 7S. As shown, the check valve 7P or 7S is arranged to permit a fluid flow toward the master cylinder M/C and check a fluid flow toward the outlet port of the pump PP or PS.

To the passage 12P, there are connected a bypass passage 17FL that bypasses the solenoid-in valve 4FL and another bypass passage 17RR that bypasses the solenoid-in valve 4RR, and to the passage 12S, there are connected a bypass passage 17FR that bypasses the solenoid-in valve 4FR and another bypass passage 17RL that bypasses the solenoid-in valve 4RL. Each of these bypass passages 17FL, 17RR, 17FR and 17RL is equipped with a check valve 10FL, 10RR, 10FR or 10RL. As shown, the check valve 10FL, 10RR, 10FR or 10RL is arranged to permit a fluid flow from the wheel cylinder W/C(FL), W/C(RR), W/C(FR) or W/C(RL) to the pump PP or PS and check a fluid flow from the pump PP or PS to the wheel cylinder W/C(FL), W/C(RR), W/C(FR) or W/C(RL).

As shown, an upstream end of the passage 12P or 12S is connected to the discharge passage 13P or 13S at a position just downstream of the check valve 7P or 7S.

As shown, on the discharge passage 13P or 13S, there is mounted a gate-out valve 3P or 3S that is a normal open type electromagnetic valve. A bypass passage 18P or 18S that bypasses the gate-out valve 3P or 3S is connected to the discharge passage 13P or 13S. The bypass passage 18P or 13S is equipped with a check valve 9P or 9S that permits a fluid flow in a direction from the master cylinder M/C to the wheel cylinders W/C(FL) and W/C(RR) or W/C(FR) and W/(RL) and checks a fluid flow in an opposite direction.

To the inlet side of the pump PP or PS, there is connected a reservoir 16P or 16S through a passage (or outlet passage) 15P or 15S. The outlet passage 15P or 15S is equipped with a check valve 8P or 8S that permits a fluid flow in a direction from the reservoir 16P or 16S to the pump PP or PS but checks a fluid flow in an opposite direction.

The wheel cylinder W/C(FL) or W/C(RR) and the outlet passage 15P is connected through a passage 14P, and the wheel cylinder W/C(FR) or W/C(RL) and the passage 15S is connected through a passage 14S. The passage 14P or 14S is connected to the outlet passage 15P or 15S at a position between the reservoir 16P or 16S and the check valve 8P or 8S. A part of the passage 14P that extends to the wheel cylinder W/C(FL) or W/C(RR) is equipped with a solenoid-out valve 5FL or 5RR, and a part of the passage 14S that extends to the wheel cylinder W/C(FR) or W/C(RL) is equipped with a solenoid-out valve 5FR or 5RL. These solenoid-out valves 5FL, 5RR, 5FR and 5RL are of a normal close type electromagnetic valve.

The hydraulic unit 31 comprises two master cylinder ports MPT through which feeding/receiving of a brake fluid between the master cylinder M/C and the P-system and that between the master cylinder M/C and the S-system are carried out respectively and four wheel cylinder ports WPT through which feeding/receiving of the brake fluid between the hydraulic unit 31 and the wheel cylinder W/C(FL), that between the hydraulic unit 31 and the wheel cylinder W/C(RR), that between the hydraulic unit 31 and the wheel cylinder W/C(FR) and that between the hydraulic unit 31 and the wheel cylinder W/C(RL) are carried out respectively. A brake piping is incorporated with the above-mentioned two master cylinder ports MPT and the four wheel cylinder ports WPT in such a manner as is shown in FIG. 1.

Upon receiving information signals from various sensors, such as a road wheel speed sensor, a yaw rate sensor, an acceleration sensor and the like, the control unit CU processes the information signals and issues various instruction signals to various hardware elements for suitably carrying out an anti-lock brake control (viz., ABS control), a vehicle dynamics control (viz., VDC), an active cruise control (viz., ACC), etc., in accordance with an operation condition of the vehicle. The hardware elements are the electric motor M, the gate-out valves 3P and 3S, the solenoid-in valves 4FL, 4RR, 4FR and 4RL, the solenoid-out valves 5FL, 5RR, 5FR and 5RL and the like.

In the first embodiment 100, the gate-out valves 3P and 3S are of a proportional control type and the other valves are of an ON/OFF type. However, if desired, all of the valves may be of a proportional control type. In the first embodiment 100, the electric motor M is of a speed control type. However, if desired, the motor M may be of an ON/OFF type.

In the following description, various operations by which the pressure in each wheel cylinder W/C(FL), W/C(RR), W/C(FR) or W/C(RL) is increased will be referred to as "pump-up operation".

[Gate-In Valves 2P and 2S]

Figure 2A:
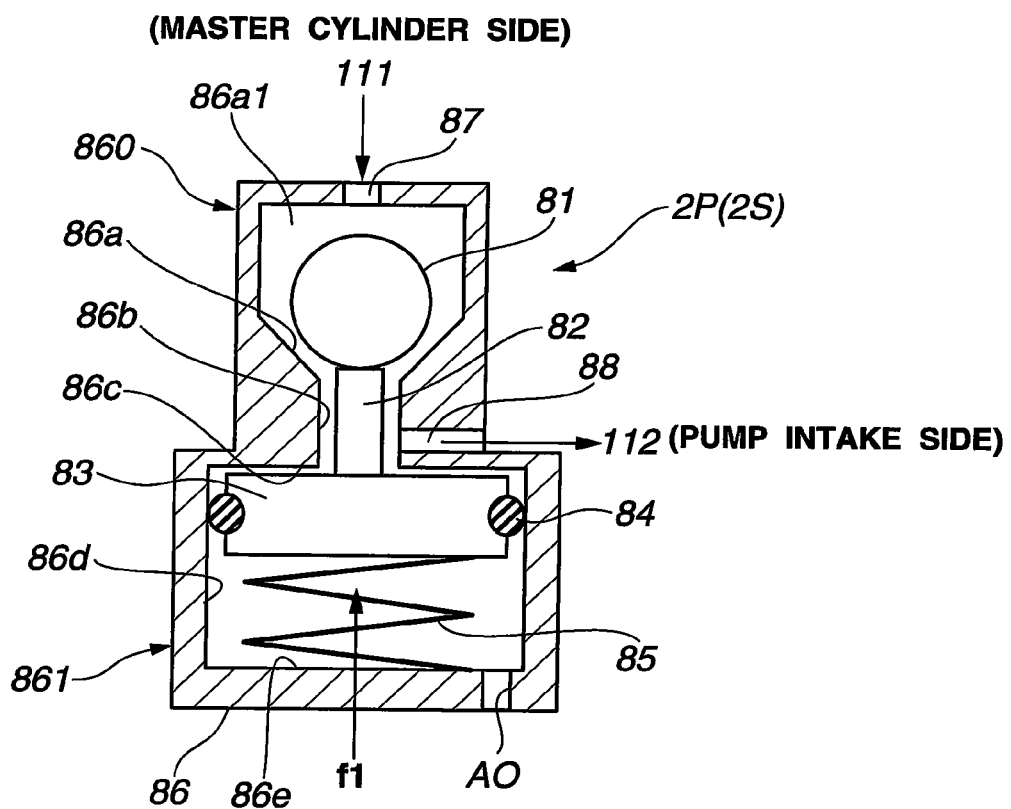
FIGS. 2A and 2B are sectional views of a gate-in valve employed in the first embodiment, FIG. 2A showing an open condition of the valve and FIG. 2B showing a closed condition of the same.
Figure 2B:
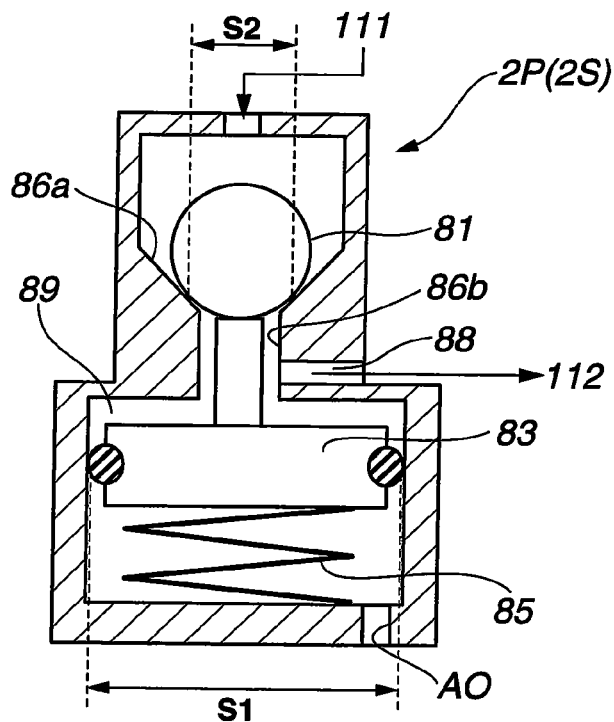

Referring to FIGS. 2A and 2B, there is schematically shown the gate-in valve 2P or 2S. FIG. 2A shows an open condition of the valve 2P or 2S in which a valve body (or ball) 81 is separated from a valve seat surface and FIG. 2B shows a closed condition of the valve 2P or 2S in which the valve body 81 is intimately seated on the valve seat surface.

As is seen from FIG. 2A, the gate-in valve 2P or 2S comprises a housing 86 that generally includes a ball receiving chamber 860 and a piston receiving chamber 861 that are fluidly connected to each other through a cylindrical passage 86b as shown. A valve body (or ball) 81 is movably received in the ball receiving chamber 860 to serve as a valve device, and a circular piston 83 is axially movably received in the piston receiving chamber 861. As will be apparent hereinafter, the piston receiving chamber 861 serves as a brake fluid reservoir.

The housing 86 has above the ball receiving chamber 860 an opening 87 to which the above-mentioned master cylinder side passage 111 is connected. The ball receiving chamber 860 includes a cylindrical chamber portion 86a1 in which the ball 81 is axially movable, and a conical chamber portion that is mated with a lower end of the cylindrical chamber portion 86a1. A conical surface of the conical chamber portion, which serves as a valve seat for the ball 81, is denoted by numeral 86a.

As is seen from FIG. 2B, when the ball 81 is operatively put on the valve seat surface 86a to cause the gate-in vale 2P or 2S to take a closed condition, the valve seat surface 86a obtains an effective pressure receiving area S2. It is to be noted that the effective pressure receiving area S2 is an area of a circular tangential line described between the ball 81 and the valve seat surface 86a. A diameter of the circular tangential line is denoted by reference "D".

As is seen from FIGS. 2A an 2B, the cylindrical passage 86b has a diameter is smaller than the diameter of the circular tangential line D. The cylindrical passage 86b has a radially extending passage 88 to which the above-mentioned "pump intake side passage" 112 is connected.

The piston receiving chamber 861 comprises a circular upper surface 86c through which the cylindrical passage 86b is exposed to the piston receiving chamber 861, a cylindrical wall 86d that has the same diameter as the circular upper surface 86c and a circular lower surface 86e' that has an opening "AO" exposed to the outside air.

Around the piston 83, there is disposed an annular seal member 84 for achieving a sealing between upper and lower chamber parts of the piston receiving chambers 861. Only upper chamber part (viz., reservoir chamber) is denoted by numeral 89. A biasing spring 85 is disposed in the lower chamber part for biasing the piston 83 upward, that is, in a direction of the ball receiving chamber 860.

Thus, as will be seen from FIG. 2B, when the brake fluid is forced to flow into the upper chamber part 89, the piston 83 is moved down against the biasing force of the spring 85 allowing the upper chamber part 89 to serve as a brake fluid reservoir. When the brake fluid has an atmospheric pressure, that is, when the brake fluid is not compressed, the piston 83 is moved up to the uppermost position by the biasing force of the spring 85 as is shown by FIG. 2A. That is, a given set load is kept applied to the biasing spring 85.

The piston 83 has a pin 82 that is inserted into the cylindrical passage 86b. Preferably, the pin 82 is welded to the piston 83. As shown, the pin 82 has a diameter smaller than that of the cylindrical passage 86b, so that a cylindrical clearance is defined between the pin 82 and an inner wall of the cylindrical passage 86b. As will become apparent from the following description, the pin 82 pushes up the ball 81 from the valve seat surface 86a when the piston 83 is moved up to a certain position.

[Operation of Gate-In Valve 2P or 2S]

For ease of understanding, the following description on the operation will be commenced with respect to an initial condition of the hydraulic brake system wherein the brake pedal B is kept released. Then, the description will be directed to a condition wherein the brake pedal B is depressed to actuate the master cylinder M/C and then to a condition wherein due to the above-mentioned pump-up operation, a compressed brake fluid is led from the master cylinder M/C to the wheel cylinders W/C(FL), W/C(RR), W/C(FR) and W/C(RL).

In the following, the master cylinder pressure is denoted by Pm, the effective pressure receiving area of the piston 83 is denoted by S1, the effective pressure receiving area of the ball 81 obtained when the ball 81 is operatively put on the valve seat surface 86a is denoted by S2 (which is smaller than S1), and the set load of the biasing spring 85 is denoted by f1. Strictly speaking, the set load f1 of the spring 85 varies in accordance with shrinkage of the spring. However, since the variation is very small, the description will be made considering that the set load f1 is constant.

[Step 1: From Initial Condition to Starting of Master Cylinder Actuation]

FIG. 2A shows a condition of the gate-in valve 2P or 2S at the time when no master cylinder pressure Pm is applied thereto. That is, under such condition, due to the force of the biasing spring 85, the pin 82 pushes up the ball 81 from the valve seat surface 86a thereby to cause the gate-in valve 2P or 2S take OPEN position.

When now the master cylinder pressure Pm is generated due to depression of the brake pedal B by a driver, the master cylinder pressure Pm is applied to the piston 83 through the passage 86b thereby to push down the piston 83 with a certain force F(=Pm×S1). When the master cylinder pressure Pm is not sufficiently high, the force F produced is smaller than the set load f1 of the biasing spring 85. Under this condition, the cylindrical chamber portion 86a1, the pump intake side passage 112 and the upper chamber part (or brake fluid reservoir) 89 of the piston receiving chamber 861 are kept communicated. As is seen from FIG. 1, even under this condition, due to provision of the check valve 8P or 8S in the passage between the gate-in valve 2P or 2S and the reservoir 16P or 16S, the brake fluid is not led to the reservoir 16P or 16S.

[Step 2: Downward Movement of Piston Due to Increased Master Cylinder Pressure]

When now the master cylinder pressure Pm is increased and the force F produced becomes larger than f1, the piston 83 is moved downward and thus the pin 82 is moved down together with the ball 81. Under this condition, an inequality "f1<Pm×S1" is established.

[Step 3: Shut Down by Ball]

When, due to the downward movement, the ball 81 becomes put on the valve seat surface 86a as is shown in FIG. 2B, the fluid connection between the master cylinder side passage 111 and the pump intake side passage 112 is closed. In this condition, hydraulic pressures applied to the ball 81 are represented by the following:

The master cylinder side of the ball: Pm

The pump intake side: f1/S1 (=Ps0)

If the master cylinder pressure Pm at the time when the ball 81 is intimately put on the valve seat surface 86a is represented by Pm0, the inequality "Pm0×S1>f1" brings about the inequality "S1>f1/Pm0". If this inequality "S1>f1/Pm0" is modified by using the above-mentioned relation, the equality "Ps0=f1/S1" brings about the inequality "Pm0>Ps0". Accordingly, even when the passage 86b is closed by the ball 81, it never occurs that the pressure "Ps0" of the pump intake side becomes higher than "f1/S1". That is, under such closed condition, the pressure "Ps0" is kept lower than the master cylinder pressure "Pm0".

[Step 4: Operation of Pump]

When now the pump PP or PS is operated, the brake fluid is led thereinto from the pump intake side passage 112, and thus, the pressure "Ps" at the pump intake side becomes lower than "Ps0". Due to this reduction of the pressure "Ps" at the pump intake side, the force for pressing down the piston 83 is reduced. Accordingly, if the inequality "f1−(Ps×S1)>Pm×S2", the ball 81 is moved upward. It is now to be noted that "Pm×S2" is the force of pressing down the piston 83. Because of the upward movement, the ball 81 becomes separated from the valve seat surface 86a thereby establishing the fluid communication between the master cylinder side passage 111 and the pump intake side passage 112 (The pressure Ps of the pump intake side at this time is a third given pressure.) Accordingly, the pump PP or PS is able to intake the brake fluid from the master cylinder M/C. Since the pressure "Ps" becomes 0 (zero) instantly upon operation of the pump PP or PS, an inequality "f1>Pm×S2" is established.

[Comparison with Known Automotive Hydraulic Brake System]

Figure 3A:
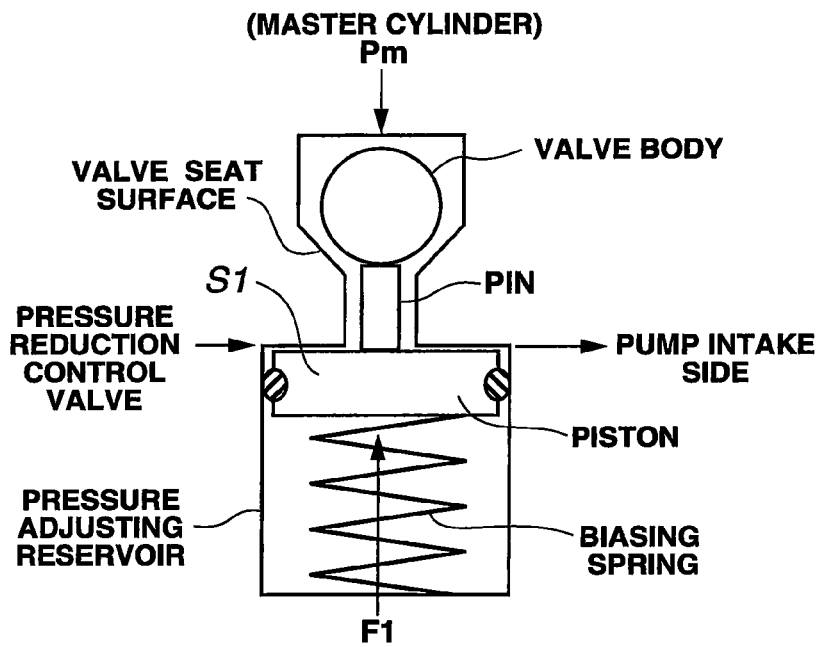
FIGS. 3A and 3B are sectional views of a known internal valve disclosed in the above-mentioned publication, FIG. 3A showing an open condition of the valve and FIG. 3B showing a closed condition of the same.
Figure 3B:
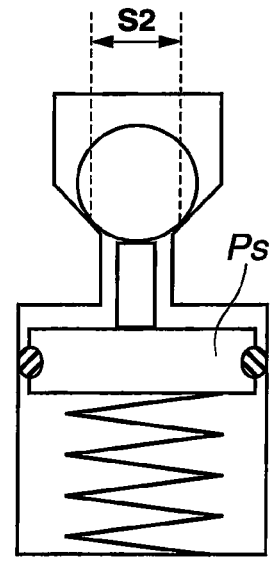

FIGS. 3A and 3B are sectional views of a known internal reservoir disclosed in the above-mentioned Japanese Laid-open Patent Application (Tokkai) 2007-238095. As is seen from these drawings, the known internal reservoir generally comprises a ball (or valve body), a piston, a pin and a biasing spring. The internal reservoir functions not only to reserve a brake fluid from a pressure reducing control valve but also to adjust a hydraulic pressure that is applied from a master cylinder to a pump intake side. For simplifying the following explanation on the known internal reservoir, the pressure receiving area of the piston will be represented by "S1", the effective pressure receiving area of the ball will be represented by "S2" and the set load of the spring will be represented by "F1". Actually, the internal reservoir has both a function of a reservoir and a function of a gate-in valve, and the OPEN/CLOSE operation of the internal reservoir is mechanically carried out. However, as has been mentioned hereinabove, in this known internal reservoir, for obtaining a smoothed braking operation against a higher master cylinder, it is necessary to increase the set load of the biasing spring or reduce the pressure reducing area of the ball. Such necessity will be easily understood from the following description.

Figure 4:
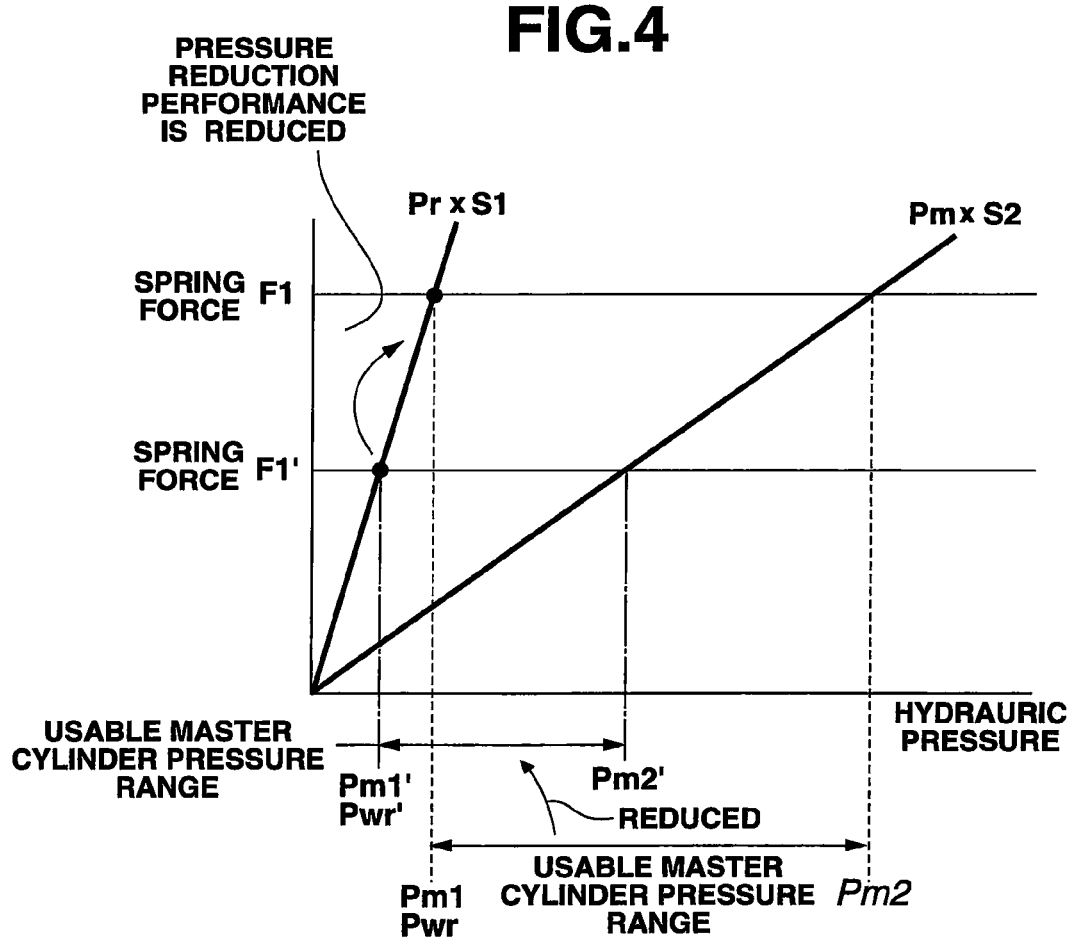
FIG. 4 is a graph showing a relationship between a hydraulic pressure and a spring force.

FIG. 4 is a graph showing a relationship between a brake fluid pressure and a set load (or spring force) of a biasing spring. As is seen from the graph, when the set load of the spring is set high, the pressure "Pr" of the brake fluid from the pressure reducing control valve becomes increased because the pressure receiving area "S1" of the piston is fixed. This means that a reducible fluid pressure from the wheel cylinders of the road wheels shows a high value and thus a sufficient pressure reduction performance to a low μ road is not obtained. While, if the pressure receiving area of the ball is set to a smaller value, a sufficient pressure reduction performance to the low μ road may be obtained. However, in this case, an intake resistance appearing when the brake fluid is sucked from the master cylinder side, such as at the time of pump up operation caused by an auto-braking, is increased and thus the pressure increasing performance is lowered. If the set load (or spring force) of the biasing spring is set small, it becomes possible to lower the pressure "Pr" of the brake fluid flowing from the pressure reducing control valve, as is indicated by the set load "F1'" of the graph of FIG. 4. However, in this case, a sufficient pressure adjusting operation is expected only when the master cylinder pressure Pm is low, and thus, the range within which a sufficient pressure adjusting operation is carried out is reduced. That is, for increasing the range for the sufficient pressure adjusting operation, it is effective to increase the set load of the biasing spring. However, in this case, such sufficient pressure adjusting operation is not expected in a case wherein the pressure "Pr" of the brake fluid from the pressure reducing control valve is low.

In view of the above, in the first embodiment 100 of the present invention, there is provided an automotive hydraulic brake system including a valve construction that allows flow of a brake fluid from a master cylinder side to a pump upon operation of the pump, and causes the brake fluid flowing from a pressure reducing control valve to be reserved by a reservoir 16P or 16S. With this brake system, the set load (or spring force) of the biasing spring 85 of the gate-in valve 2P or 2S can be set relatively high for increasing the range of the master cylinder pressure Pm within which a sufficient pressure adjusting operation is achieved and at the same time the set load (or spring force) of the biasing spring (no numeral) of the reservoir 16P or 16S can be set to a smaller value that allows the reservoir 16P or 16S to reserve the brake fluid of much lower pressure.

Thus, in the first embodiment 100 of the present invention, by increasing the cross section of the cylindrical passage 86b of the gate-in valve 2P or 2S, the effective pressure receiving area of the ball 81 can be increased and thus the fluid intake resistance of the pump 2P or 2S is restrained. Furthermore, since the set load (or spring force) of the biasing spring (no numeral) of the reservoir 16P or 16S can be independently set to a low level, sufficient pressure reduction performance to a low μ road is obtained. Furthermore, the pressure at the pump intake side can be set to a relatively low level, so that seal members installed in the pump PP or PS are prevented from attack of high hydraulic pressure.

[Pump Up Operation at the Time of Application of Master Cylinder Pressure]

Figure 5:
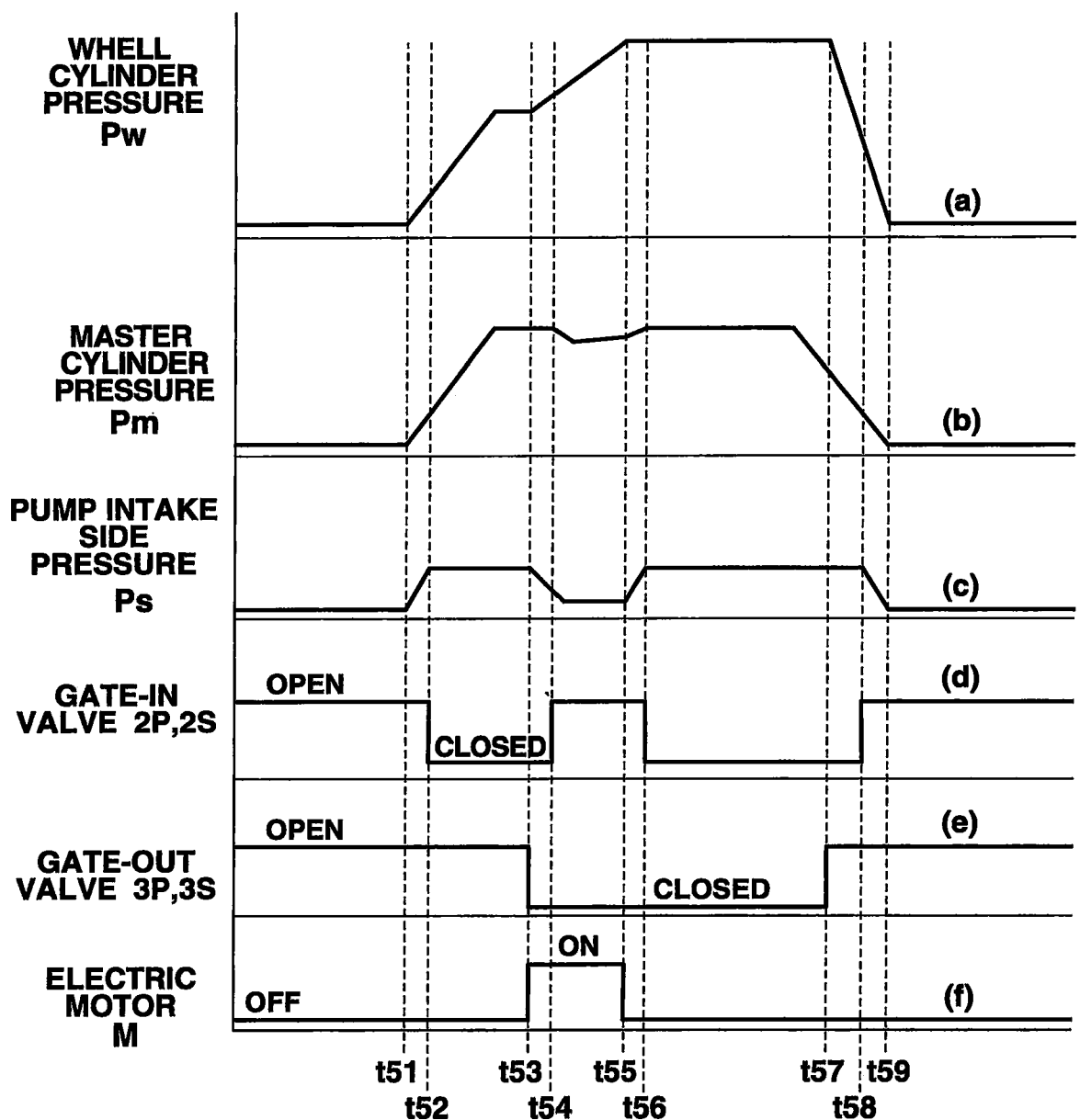
FIG. 5 is a time chart showing a pump up operation of the hydraulic brake system of the first embodiment.

FIG. 5 is a time chart showing a pump up operation of the hydraulic brake system of the first embodiment 100. As has been mentioned hereinabove, the pump up operation is the to operation that is carried out when the master cylinder pressure Pm is practically applied to the hydraulic circuit of the brake system.

At the time t51, the brake pedal BP is depressed by a driver. Upon this, both the master cylinder pressure Pm and the wheel cylinder pressure Pw start to increase. At the time t52, that is, when "f1<Pm×S1" is established, the gate-in valve 2P or 2S is closed thereby suppressing the pump intake side pressure Ps0 from further increasing.

At the time t53, an instruction signal is issued for increasing the wheel cylinder pressure Pw. Upon this, the gate-out valve 3P or 3S is closed and the motor M is turned ON. Since, under this condition, the pump intake side pressure Ps is kept higher than the third given pressure, the gate-in valve 2P or 2S is kept closed, so that the pump PP or PS sucks the brake fluid from the reservoir chamber 89 (see FIG. 2B) of the gate-in valve 2P or 2S.

When, at the time t54, the pump intake side pressure Ps becomes lower than the third given pressure, the gate-in valve 2P or 2S is opened, so that the valve 2P or 2S sucks the brake fluid from the master cylinder M/C thereby to increase the wheel cylinder pressure Pw.

When, at the time t55, the instruction signal for increasing the wheel cylinder pressure Pw is ceased, the motor M is de-energized. Upon this, the pump intake side pressure Ps starts to increase. When, at the time t56, the pump intake side pressure Ps exceeds the third given pressure, the gate-in valve 2P or 2S is closed again. With this, the pump intake side pressure Ps is kept below than a first given pressure.

When, at the time t57, an instruction signal is issued for reducing the pressure of the brake fluid fed to the wheel cylinders, the gate-out valve 3P or 3S is opened. Upon this, the wheel cylinder pressure Pw is reduced together with the master cylinder pressure Pm.

When, at the time t58, the master cylinder pressure Pm becomes lower than the first given pressure, the gate-in valve 2P or 2S is opened and thus the pump intake side pressure Ps is reduced.

At the time t59, the master cylinder pressure Pm, the wheel cylinder pressure Pw and the pump intake side pressure Ps become 0 (zero).

In the first embodiment 100, the check valve 8P or 8S is employed. By using such check valve 8P or 8S, until the time when the gate-in valve 2P or 2S becomes closed due to application of the master cylinder pressure Pm thereto (that is, under the condition wherein the master cylinder pressure Pm is kept lower than the first given pressure), transmission of the master cylinder pressure Pm to the reservoir 16P or 16S is suppressed. With this, consumption of the brake fluid fed from the master cylinder M/C can be reduced, stroke of the brake pedal BP can be reduced and feeding a brake fluid to the wheel cylinders W/C at a service of the brake system can be quickly made. However, such check valve 8P or 8S may be removed.

In the following, nine advantages of the automotive hydraulic brake system of the first embodiment 100 will be enumerated.

(1) There is employed a unique circuit that comprises the intake passage 11P or 11S by which the master cylinder M/C and the inlet side of the pump PP or PS are connected, the discharge passage 13P or 13S by which the outlet side of the pump PP or PS and the master cylinder M/C are connected, the connecting passage 12P or 12S by which the discharge passage 13P or 13S and each of the wheel cylinders W/C(FL), W/C(RR), W/C(FR) and W/C(RL) are connected, the connecting passage 14P or 14S connected to the reservoir 16P or 16S that reserves the pressure reduced brake fluid fed from the wheel cylinders, the outlet passage 15P or 15S by which the reservoir 16P or 16S and the intake passage 11P or 11S are connected, and the gate-in valve 2P or 2S that functions to open and close the intake passage 11P or 11S in accordance with a pressure difference between the master cylinder pressure Pm and the pump intake side pressure Ps. That is, in the first embodiment 100 of the present invention, besides the conventional reservoir 16P or 16S, there is employed the gate-in valve 2P or 2S that opens and closes the intake passage 11P in accordance with the pressure difference between the master cylinder pressure Pm and the pump intake side pressure Ps. Thus, the characteristic of the gate-in valve 2P or 2S can be easily set.

(2) The gate-in valve 2P or 2S is arranged to open and close the intake passage 11P or 11S in accordance with a pressure difference between the master cylinder pressure Pm and the pump intake side pressure Ps which are produced in front and rear portions of the intake passage 11P or 11S with respect to the valve 2P or 2S. Due to usage of the pressure appearing at the front and rear portions of the intake passage 11P or 11S, the open and close operation for the intake passage 11P or 11S is easily carried out.

(3) Under a condition wherein the master cylinder pressure Pm is within a range from the first given pressure to the second given pressure, the gate-in valve 2P or 2S is closed when the pump intake side pressure Ps is higher than the third given pressure, but opened when the pump intake side pressure Ps is lower than the third given pressure. That is, the working pressure of the gate-in valve 2P or 2S is easily set at will. Even when the master cylinder pressure Pm is kept generated, the pump PP or PS is able to suck the brake fluid and a low pressure portion of the pump PP or PS can be protected.

(4) To the outlet passage 15P or 15S, there is connected the check valve 8P or 8S that checks a fluid flow in a direction from the gate-in valve 2P or 2S to the reservoir 16P or 16S but allows a fluid flow in an opposite direction. Accordingly, undesired flow of the brake fluid to the reservoir 16P or 16S at the time when the master cylinder pressure Pm is practically is applied can be suppressed, which improves a pedal depression feeling of the brake pedal BP.

(5) The gate-in valve 2P or 2S comprises the intake passage 11P or 11S that is closed by a certain pressure from the master cylinder M/C, a valve seat portion formed on the intake passage 11P or 11S, a ball (or valve body) 81 that is able to be put on the valve seat portion, the piston 83 that is movable together with the ball 81 through the pin 82 and the biasing spring 85 that biases the piston 83 toward the ball 81. Thus, the gate-in valve 2P or 2S can be simple in construction.

(6) When the master cylinder pressure is represented by Pm, the sectional area of the piston 83 is represented by S1, the sectional area of the intake passage that is closed by the ball 81 is represented by S2 and the set load (or spring force) of the biasing spring 85 is represented by f1, the set load f1 of the biasing spring 85 can be defined or represented by "Pm×S1>f1>Pm×S2". This inequality has substantially no influence on the performance of the reservoir 16P or 16S, and thus, the set load f1 can be widely varied to deal with a wide range master cylinder pressure Pm.

(7) Since f1/S1, f1/S2 and 0<f1/S1 can be represented by first, second and third given values or condition, the gate-in valve 2P or 2S can be easily set in accordance with a needed condition.

(8) The hydraulic unit 31 having therein the pumps PP and PS driven by the electric motor M comprises the two master cylinder ports MPT through which the master cylinder M/C and internal passages are connected, the intake passages 11P and 11S each connecting the master cylinder port MPT with an intake side of the corresponding pump PP or PS, the passages 13P and 13S each being branched from the intake passage 11P or 11S to connect the discharge side of the pump PP or PS with the corresponding master cylinder port MPT, the wheel cylinder ports WPT each connecting the passage 12P or 12S branched from the passage 13P or 13S with the corresponding one of the wheel cylinders W/C, the reservoirs 16P and 16S each receiving the brake fluid from the wheel cylinders W/C through corresponding wheel cylinder port WPT, the ports 14P and 14S each connecting the wheel cylinder port WPT with the corresponding reservoir 16P or 16S, the outlet passage 15P or 15S each connecting the reservoir 16P or 16S with the corresponding intake passage 11P or 11S, and the gate-in valves 2P and 2S each being mounted in the intake passage 11P or 11S and functioning to open and close the intake passage 11P or 11S in accordance with a pressure difference between pressures appearing in the intake passage 11P or 11S at front and rear portions of the gate-in valve 2P or 2S. That is, in the first embodiment 100 of the present invention, besides the reservoirs 16P and 16S, there are employed the two gate-in valves 2P and 2S each functioning to open and close the corresponding intake passage 11P or 11S in accordance with the pressure difference. Thus, the characteristics of the gate-in valves 2P and 2S can be easily set.

(9) The hydraulic brake system of the first embodiment 100 comprises the hydraulic unit 31 that has therein the pumps PP and PS, the intake passages 11P and 11S each connecting the outside of the hydraulic unit 31 and the intake side of the corresponding pump PP or PS, the discharge passages 13P and 13S each connecting the discharge side of the pump PP or PS with the outside of the hydraulic unit 31, the passages 12P and 12S each being branched from the discharge passage 13P or 13S and connected to the corresponding wheel cylinder W/C, the passages 14P and 14S connected to the reservoirs 16P and 16S, each reservoir receiving the brake fluid from the wheel cylinders W/C arranged outside the hydraulic unit 31, and the gate-in valves 2P and 2S each being mounted in the intake passage 11P or 11S and functioning to open and close the intake passage 11P or 11S in accordance with a pressure difference between pressures appearing in the intake passage 11P or 11S at front and rear portions of the gate-in valve 2P or 2S, wherein the pump PP or PS functions to suck the brake fluid from the outside of the hydraulic unit 31 through the gate-in valve 2P or 2S. That is, in the first embodiment 100, besides the reservoirs 16P and 16S, there are employed the two gate-in valves 2P and 2S each functioning to open and close the corresponding intake passage 11P or 11S in accordance with the pressure difference. Thus, the characteristics of the gate-in valves 2P and 2S can be easily set.

In the following, an automotive hydraulic brake system of a second embodiment 200 of the present invention will be described with reference to FIG. 6.

Since the brake system of the second embodiment 200 is similar to that of the above-mentioned first embodiment 100, only portions or parts that are different from those of the first embodiment 100 will be described in detail in the following.

Figure 6:
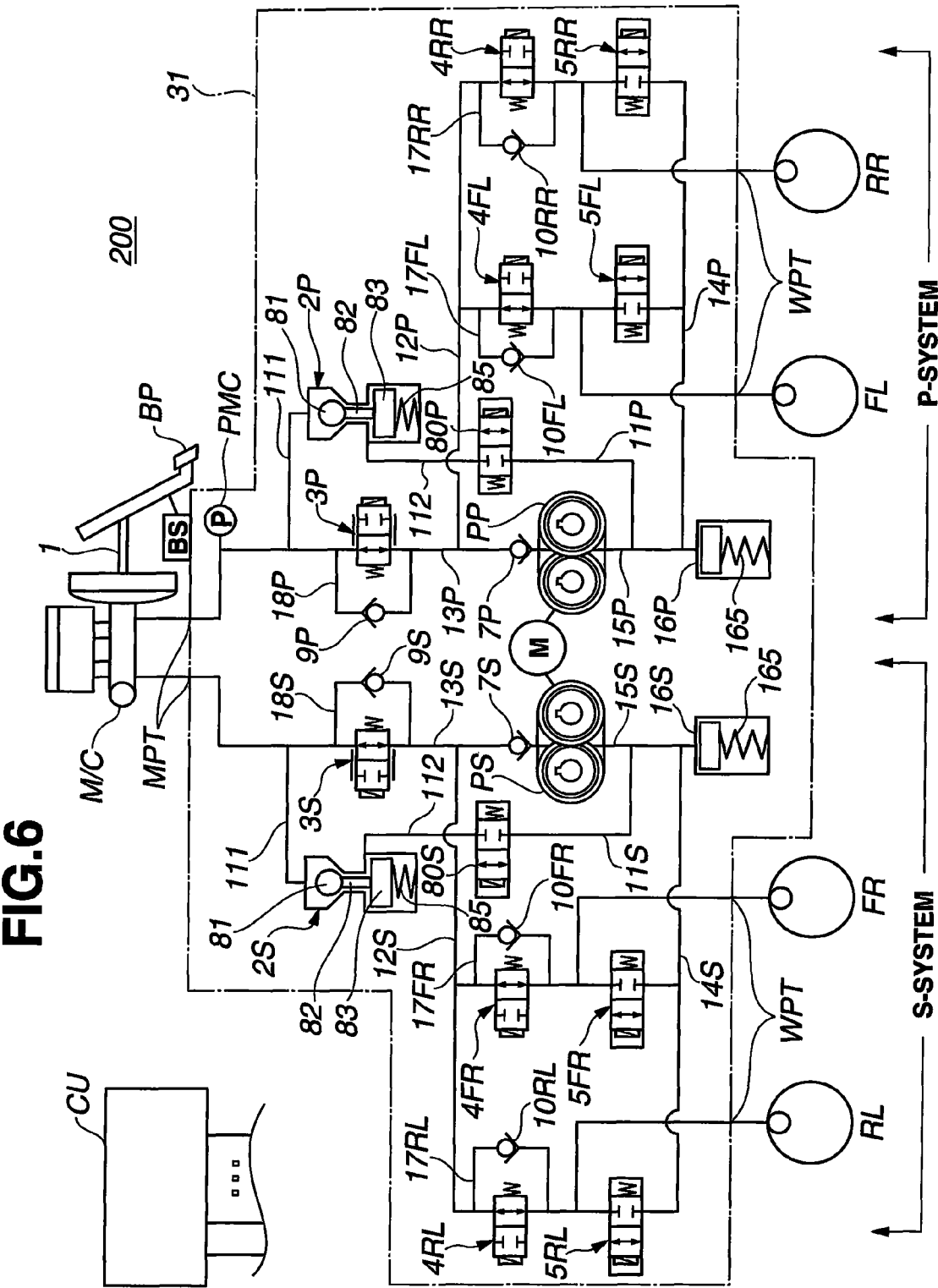
FIG. 6 is a view similar to FIG. 1, but showing a second embodiment of the present invention.

Referring to FIG. 6, there is schematically shown a hydraulic circuit of the automotive hydraulic brake system of the second embodiment 200 of the present invention.

As is seen from the drawing, in this second embodiment 200, in place of the check valves 8P and 8S used in the above-mentioned first embodiment 100, electromagnetic valves 80P and 80S are used which are operatively mounted on the intake passages 11P and 11S respectively. More specifically, each electromagnetic valve 80P or 80S is mounted on the intake passage 11P or 11S at a portion between the gate-in valve 2P or 2S and the outlet passage 15P or 15S. Upon receiving instruction signals from the control unit CU, each electromagnetic valve 80P or 80S carries out a suitable ON/OFF (or open/close) operation to selectively open and close the outlet passage 15P or 15S between the gate-in valve 2P or 2S and the intake side of the pump PP or PS.

In the following, operation of the second embodiment 200 will be described with the aid of FIG. 6.

In normal braking, the electromagnetic valves 80P and 80S are closed. However, in case wherein, like in a brake assist control, the wheel cylinder pressure Pw is controlled higher than the master cylinder pressure Pm, the electromagnetic valves 80P and 80S are opened. Accordingly, in the normal braking, the practical usage of the brake fluid in the intake passages 11P and 11S is restrained until the time when, due to addition of the master cylinder pressure Pm to the gate-in valves 2P and 2S, the valves 2P and 2S become closed (that is, the master cylinder pressure Pm is below the first given pressure). Furthermore, until the time, application of the master cylinder pressure Pm to the reservoirs 16P and 16S and to the solenoid-out valves 5FL, 5RR, 5FR and 5RL is suppressed, and application of the master cylinder pressure Pm to the intake sides of the two pumps PP and PS is suppressed. Accordingly, consumption of the brake fluid led from the master cylinder M/C can be much saved, a stroke efficiency of the brake pedal BP can be improved and a rapid response of the wheel cylinder pressure Pw in the normal braking can be obtained. Furthermore, in case of controlling the wheel cylinder pressure Pw higher than the master cylinder pressure Pm, the same advantageous effect as that of the above-mentioned first embodiment 100 is obtained since the electromagnetic valves 80P and 80S are opened. Furthermore, when, with the master cylinder pressure Pm being substantially 0 (zero), it is needed to discharge the brake fluid from the reservoirs 16P and 16S, that is, when, with the gate-in valves 2P and 2S being opened, it is needed to discharge the brake fluid from the reservoirs 16P and 16S, closing the electromagnetic valves 80P and 80S brings about an effective discharge of the brake fluid from the reservoirs 16P and 16S because the pumps PP and PS are suppressed from sucking the brake fluid from the master cylinder M/C.

Accordingly, in the second embodiment 200, besides the above-mentioned nine advantages (1) to (9) possessed by the first embodiment 100, the following advantage is obtained.

(10) Due to provision of the electromagnetic valves 80P and 80S on the respective intake passages 11P and 11S, the stroke efficiency of the brake pedal BP is improved and a rapid response of the wheel cylinder pressure Pw in the normal braking is obtained. Furthermore, the brake fluid in the reservoirs 16P and 16S can be effectively discharged upon need.

In the following, an automotive hydraulic brake system of a third embodiment 300 of the present invention will be described with reference to FIG. 7.

Like in the above-mentioned second embodiment 200, the brake system of the third embodiment 300 is similar to that of the above-mentioned first embodiment 100, only portions or parts that are different from those of the first embodiment 100 will be described in detail in the following.

Figure 7:
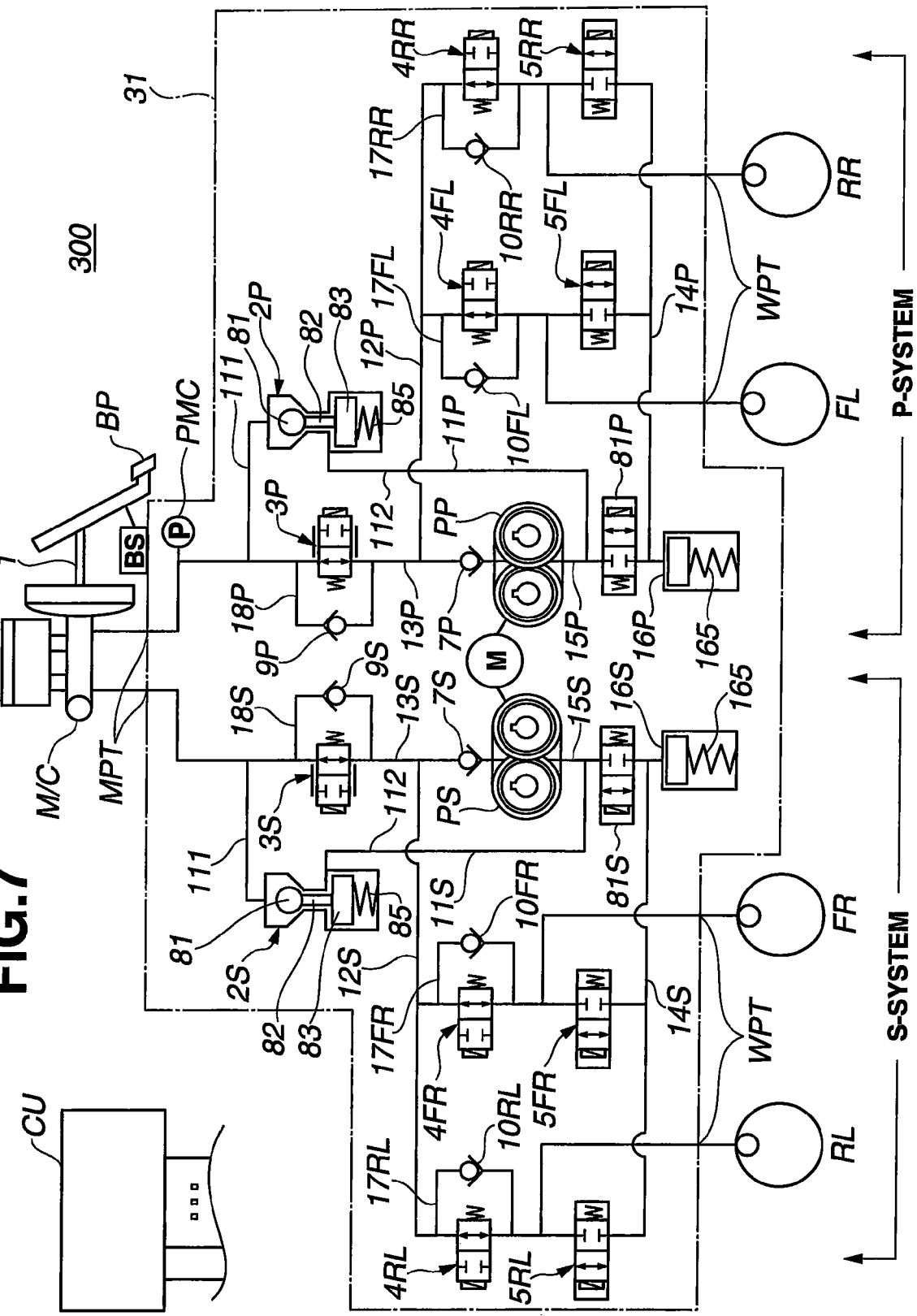
FIG. 7 is a view similar to FIG. 1, but showing a third embodiment of the present invention.

Referring to FIG. 7, there is schematically shown a hydraulic circuit of the automotive hydraulic brake system of the third embodiment 300 of the present invention.

As is seen from the drawing, in this third embodiment 300, in place of the check valves 8P and 8S, electromagnetic valves 81P and 81S are used which are operatively mounted on the outlet passages 15P and 15S respectively. More specifically, each electromagnetic valve 81P or 81S is mounted on the outlet passage 15P or 15S at a portion between the intake side of the pump PP or PS to which the intake passage 11P or 11S from the gate-in valve 2P or 2S is connected and the reservoir 16P or 16S, as shown. Upon receiving instruction signals from the control unit CU, each electromagnetic valve 81P or 81S carries out a suitable ON/OFF (or open/close) operation to selectively open and close the outlet passage 15P or 15S between the intake side of the pump PP or PS and the reservoir 16P or 16S, as shown.

In the following, operation of the third embodiment 300 will be described with the aid of FIG. 7.

Only when it is needed to discharge the brake fluid, which has been reserved upon the anti-lock braking operation (viz., ABS control), from the reservoirs 16P and 16S, the electromagnetic valves 81P and 81S are opened, and in other cases, such as, the case of normal braking and the case of controlling the wheel cylinder pressure Pw higher than the master cylinder pressure Pm, the electromagnetic valves 81P or 81S are closed. Accordingly, substantially same advantages as those of the above-mentioned first embodiment 100 are obtained also in this third embodiment 300. Furthermore, in normal braking, until the time when, due to addition of the master cylinder pressure Pm to the gate-in valves 2P and 2S, the valves 2P and 2S becomes closed (that is, the master cylinder pressure Pm is below the first given pressure), application of the brake fluid to the reservoirs 16P and 16S and to the solenoid-out valves 5FL, 5RR, 5FR and 5RL is suppressed. Thus, consumption of the brake fluid from the master cylinder M/C can be saved. Furthermore, in case of controlling the wheel cylinder pressure Pw higher than the master cylinder pressure Pm, the electromagnetic valves 81P and 81S are kept closed, and thus, the brake fluid that is to be sucked by the pumps PP and PS is supplied from only the master cylinder side.

Accordingly, in the third embodiment 300, besides the above-mentioned nine advantages (1) to (9) possessed by the first embodiment 100, the following advantage is obtained.

(11) Due to provision of the electromagnetic valves 81P and 81S on the respective outlet passages 15P and 15S, the stroke efficiency of the brake pedal BP is improved and a rapid response of the wheel cylinder pressure Pw in the normal braking is obtained. Furthermore, the brake fluid in the reservoirs 16P and 16S can be effectively discharged upon need.

The entire contents of Japanese Patent Application 2009-072248 filed Mar. 24, 2009 are incorporated herein by reference.

Although the invention has been described above with reference to embodiments of the invention, the invention is not limited to such embodiments as described above. Various modifications and variations of such embodiments may be carried out by those skilled in the art, in light of the above description.

What is claimed is:

1. A hydraulic brake system comprising:
an intake passage connecting a master cylinder to an intake side of a fluid pump;
a discharge passage connecting a discharge side of the fluid pump to the master cylinder;
a first passage branched from the discharge passage and connected to a wheel cylinder;
a pressure reduction passage connected to a reservoir that reserves a pressure reduced brake fluid from the wheel cylinder;
an outlet passage connecting the reservoir to the intake passage; and
a gate-in valve that selectively opens and closes the intake passage in accordance with both a master cylinder pressure produced by the master cylinder and a pump intake side pressure produced in an intake side of the fluid pump;
wherein the gate-in valve selectively opens and closes the intake passage in accordance with a pressure difference between the master cylinder pressure and the pump intake side pressure;
wherein, when the master cylinder pressure is higher than a first given pressure and lower than a second given pressure, the gate-in valve takes a closed position when the pump intake side pressure is higher than a third given pressure but takes an open position when the pump intake side pressure is lower than the third given pressure;
wherein the gate-in valve comprises:
a valve seat provided in a part of the intake passage;
a valve body that is movable onto the valve seat to close the intake passage when a certain pressure is produced by the master cylinder;
a piston movable together with the valve body;
a pin having one end fixed to the piston and the other end contactable with the valve body; and
a biasing spring biasing the piston toward the valve body; and
wherein the following inequality is satisfied by the brake system:

$$Pm \times S1 > f1 > Pm \times S2,$$

wherein:
Pm: the master cylinder pressure;
S1: a sectional area of the piston;
S2: a sectional area of the intake passage at the valve seat that is actually closed by the valve body; and
f1: biasing force of the biasing spring.

2. A hydraulic brake system as claimed in claim 1, in which the first given pressure is represented by f1/S1 and the second given pressure is represented by f1/S2, and the third given pressure is represented by 0<f1/S1.

3. A hydraulic brake system comprising:
a fluid pump driven by an electric motor; and
a housing that houses therein the fluid pump;
wherein the housing comprises:
   a master cylinder port to be connected to a master cylinder that is arranged outside the housing;
   an intake passage connecting the master cylinder port to an intake side of the fluid pump;
   a discharge passage connecting a discharge side of the fluid pump to the master cylinder port;
   a first passage branched from the discharge passage;
   a wheel cylinder port connecting the first passage to a wheel cylinder that is arranged outside of the housing;
   a pressure reduction passage through which a brake fluid in the wheel cylinder is led into a reservoir through the wheel cylinder port; and
   an outlet passage connecting the reservoir to the intake passage;
wherein the intake passage is provided with a pressure valve that selectively opens and closes the intake passage in accordance with a pressure difference between pressures respectively appearing at upstream and downstream portions of the intake passage with respect to the pressure valve;
wherein the pressure valve comprises:
   a valve seat provided in a part of the intake passage;
   a valve body that is movable onto the valve seat to close the intake passage when a certain pressure is produced by the master cylinder;
   a piston movable together with the valve body;
   a pin having one end fixed to the piston and the other end contactable with the valve body; and
   a biasing spring biasing the piston toward the valve body; and
wherein the following inequality is satisfied by the brake system:

$$Pm \times S1 > f1 > Pm \times S2,$$

wherein:
   Pm: the master cylinder pressure;
   S1: a sectional area of the piston;
   S2: a sectional area of the intake passage at the valve seat that is actually closed by the valve body; and
   f1: biasing force of the biasing spring.

4. A hydraulic brake system as claimed in claim 3, in which when the master cylinder pressure is higher than a first given pressure and lower than a second given pressure, the pressure valve takes a closed position when the pump intake side pressure is higher than a third given pressure but takes an open position when the pump intake side pressure is lower than the third given pressure.

5. A hydraulic brake system as claimed in claim 3, in which the first given pressure is represented by f1/S1 and the second given pressure is represented by f1/S2, and the third given pressure is represented by 0<f1/S1.

6. A hydraulic brake system as claimed in claim 3, in which the outlet passage is equipped with a check valve that permits a fluid flow in a direction from the reservoir to the intake side of the fluid pump but checks a fluid flow in an opposite direction.

7. A hydraulic brake system as claimed in claim 3, in which the intake passage is equipped at a position between the pressure valve and the fluid pump with an electromagnetic valve.

8. A hydraulic brake system comprising:
a housing, housing therein a fluid pump;
an intake passage connecting an outside portion of the housing to an intake side of the fluid pump;
a discharge passage connecting a discharge side of the fluid pump to the outside portion of the housing;
a first passage branched from the discharge passage and connected to a wheel cylinder that is positioned outside the housing;
a pressure reduction passage through which a brake fluid in the wheel cylinder is led into a reservoir;
an outlet passage connecting the reservoir to the intake passage; and
a gate-in valve provided by the intake passage, the gate-in valve selectively opening and closing the intake passage in accordance with a pressure difference between pressures respectively appearing at upstream and downstream portions of the intake passage with respect to the gate-in valve;
wherein the fluid pump is arranged to suck the brake fluid through the gate-in valve from the outside portion of the housing;
wherein the gate-in valve comprises:
   a valve seat provided in a part of the intake passage;
   a valve body that is movable onto the valve seat to close the intake passage when a certain pressure is produced by a master cylinder that is arranged at an outside portion of the housing;
   a piston movable together with the valve body;
   a pin having one end fixed to the piston and the other end contactable with the valve body; and
   a biasing spring biasing the piston toward the valve body; and
wherein the following inequality is satisfied by the brake system:

$$Pm \times S1 > f1 > Pm \times S2,$$

wherein:
   Pm: the master cylinder pressure;
   S1: a sectional area of the piston;
   S2: a sectional area of the intake passage at the valve seat that is actually closed by the valve body; and
   f1: biasing force of the biasing spring.

9. A hydraulic brake system as claimed in claim 8, in which when the master cylinder pressure is higher than a first given pressure and lower than a second given pressure, the gate-in valve takes a closed position when the pump intake side pressure is higher than a third given pressure but takes an open position when the pump intake side pressure is lower than the third given pressure.

10. A hydraulic brake system as claimed in claim 9, in which the first given pressure is represented by f1/S1 and the second given pressure is represented by f1/S2, and the third given pressure is represented by 0<f1/S1.

11. A hydraulic brake system as claimed in claim 8, in which the outlet passage is equipped with a check valve that permits a fluid flow in a direction from the reservoir to the intake side of the fluid pump but checks a fluid flow in an opposite direction.

12. A hydraulic brake system as claimed in claim 8, in which the intake passage is equipped at a position between the gate-in valve and the fluid pump with an electromagnetic valve.

* * * * *